3,121,634
ANIMAL FEED COMPOSITIONS
Thomas P. Kichline, Chesterfield, and James E. Schoolmeester, Bridgeton, Mo., assignors to Monsanto Chemical Company, St. Louis, Mo., a corporation of Delaware
No Drawing. Filed Apr. 3, 1961, Ser. No. 100,024
4 Claims. (Cl. 99—2)

This invention relates to compositions useful in the feeding of animals and more particularly to calcium and phosphate-containing compositions especially useful in the feeding of poultry.

For adequate growth, animals must be fed minimum quantities of calcium and phosphorus and for many years it has been conventional to supplement the feed of animals with inorganic salts providing calcium and phosphate materials. Among the most widely employed inorganic salts has been dicalcium phosphate but the use of this salt has certain disadvantages. A first such disadvantage is that phosphate derived from dicalcium phosphate is sometimes not assimilated as rapidly as might be desired, possibly due to the relatively low solubility of dicalcium phosphate in the digestive juices. Another disadvantage has been that calcium from calcium phosphates interferes with the absorption of tetracycline antibiotics by animals to which calcium phosphates are fed. In spite of these disadvantages, however, the use of dicalcium phosphate has continued due largely to its availability in relatively pure form and its freedom from caking tendencies.

It is a primary object of this invention to provide a composition which advantageously can be employed in lieu of pure dicalcium phosphate in the preparation of animal feeds and which results in feeds at least partially free from the disadvantage of those prepared from dicalcium phosphate as the sole source of phosphorous.

The above and other objects of the invention are accomplished by a composition comprising a mixture of calcium sulfate dihydrate, monocalcium phosphate and, if desired, a limited amount of dicalcium phosphate. A composition of this formulation has the advantage that the phosphate therein is more readily available to an animal to which it is fed, and the advantage that feeds formulated therefrom do not interfere with the assimilation of tetracycline antibiotics to the same extent as comparable feeds formulated with dicalcium phosphate as the only source of phosphate material. The composition has the further advantage that it is normally free from caking tendencies and provides a good source of dietary sulfur for poultry.

The amount of calcium sulfate dihydrate present in a composition in accordance with this invention can vary from about 5% to 40% based upon the total weight of inorganic calcium salts present in the composition. At least about 5% calcium sulfate dihydrate is required to effect a noticeable improvement upon the absorption by animals of tetracycline antibiotics added to a feed formulated from or comprising said composition. If, however, the amount of calcium sulfate dihydrate is in excess of about 40% by weight, on the same basis as above, it may result in an undesirably high fluid intake by poultry to which a feed formulated from the composition is fed. The composition preferably contains from about 10 to 30% calcium sulfate dihydrate based upon the total weight of inorganic calcium salts present.

The amount of monocalcium phosphate in a composition in accordance with this invention can range from about 20% to 90% based upon the total weight of inorganic calcium salts present in the composition. If the monocalcium phosphate content is in excess of about 90% by weight of the inorganic calcium salts, a concentrated mixture of the inorganic salts must be maintained in a highly dehydrated state to avoid caking difficulties and if the monocalcium phosphate content falls below about 20% by weight of inorganic calcium salts, the advantages of the present invention are not fully obtained. Preferably the composition contains from about 25 to 50% monocalcium phosphate based upon the total weight of inorganic calcium salts.

While a composition in accordance with this invention can contain calcium sulfate dihydrate and monocalcium phosphate as the only inorganic calcium salts, it is an advantage of the invention that up to about 75% of the total weight of calcium salts can be dicalcium phosphate. As mentioned above, dicalcium phosphate has several advantages as a feed supplement and additionally is among the least expensive phosphate salts available. For these reasons, a composition in accordance with this invention preferably contains from about 20 to 60% based upon the total weight of inorganic salts of dicalcium phosphate.

In addition to the requirements previously set forth, a composition in accordance with this invention should be so formulated that the calcium to phosphorus ratio, on a mass basis, is from about 0.7/1 to 1.4/1, and preferably from about 1/1 to 1.3/1. In a complete feed the most desirable calcium to phosphorus ratio for chicks is 1.3/1 and for turkeys it is 1.25/1. In mineral concentrates the calcium to phosphorus ratio is most desirably somewhat lower than the above to permit the feed formulator to take into consideration the natural calcium content of the other feed constituents in formulating the finished product. In other words, nutritive materials normally contain limited quantities of calcium, and the calcium derived from this source will vary. If a mineral concentrate is supplied with a calcium to phosphorus ratio somewhat lower than that desired in a complete feed, the feed formulator can adjust the final calcium content of a feed mixture by the addition of a small amount of a calcium salt, such as calcium sulfate, without affecting the phosphate content of the mixture.

A complete animal feed should generally contain at least about 0.3% phosphorus and will normally contain at least 0.4% phosphorus, and if the phosphorus in the feed composition is below this amount, animal growth rate is frequently not at a satisfactory level. There is no precise upper limit as to the amount of phosphorus in the form of phosphate which suitably may be present in the diet but normally for economic reasons the complete feed will contain not more than about 2 or 3% phosphorus.

A composition in accordance with this invention can be formulated by any suitable procedure. For example, all of the components of a feed mixture, including carbohydrate, fat and protein material, can be mixed in any order using conventional mixing equipment. Preferably, however, a concentrate consisting at least about 80% by weight of inorganic calcium salts is first made and this mixture thereafter used in the formulation of the complete animal feed. Little difficulty with caking is normally encountered and the concentrate can be readily shipped, stored and used at any convenient location for the formulation of complete feed products.

The invention will now be further illustrated by the following specific example in which all parts are by weight unless otherwise indicated:

*Example*

In suitable mixing equipment there is placed 35 parts of monocalcium phosphate, 45 parts of dicalcium phosphate and 20 parts of calcium sulfate dihydrate. The resulting mixture is thoroughly stirred to provide a concentrate which can be compounded with other animal food ingredients to provide a balanced diet for poultry or other animals. The calcium to phosphorus ratio in this concentrate is 1.25/1; the percent phosphorus is 18.8; the percent calcium is 23.4; and the percent calcium from calcium sulfate is 19.7.

In suitable mixing equipment there is placed 3.5 parts of the above concentrate; 2.5 parts of distillers' solubles; 2 parts of dehydrated alfalfa meal, 61 parts of ground yellow corn, 19 parts of soy bean meal, 6 parts of corn gluten meal; 5 parts of fish meal; 0.5 part of sodium chloride, and 0.5 part of a balanced vitamin mixture. A tetracycline antibiotic such as chlortetracycline or oxytetracycline may be added to the formulation usually at about 200 g./ton of feed. The resulting feed mixture can suitably be fed to poultry of any type and contains calcium and phosphorus in a most desirable ratio for baby turkeys.

Having thus described our invention and a preferred specific embodiment thereof, what we desire to claim and secure by Letters Patent is:

1. A composition useful in the feeding of animals comprising calcium sulfate dihydrate and monocalcium phosphate, the calcium to phosphorus ratio in said composition being from about 0.7 to 1.4/1, the percentage, based on total weight of inorganic calcium salts, of calcium sulfate dihydrate in said composition being from about 5 to 40%, the percentage of monocalcium phosphate in said composition, based on the total weight of inorganic calcium salts, being from about 20 to 90%, and the phosphate content of said composition being at least about 0.3% by weight.

2. A composition as in claim 1 additionally containing dicalcium phosphate in an amount less than about 75% of the total weight of inorganic calcium salts present in said composition.

3. A composition according to claim 2 composed at least about 80% by weight of inorganic calcium salts and suitable for mixing with nutrient materials in the formulation of balanced animal feeds.

4. A composition as in claim 2 having a calcium to phosphorus ratio of from about 1/1 to 1.3/1 and containing calcium sulfate dihydrate in an amount of from 10 to 30% of the total weight of inorganic calcium salts in said composition, monocalcium phosphate in an amount of from 25 to 50% of said total weight of inorganic calcium salts and dicalcium phosphate in an amount of from 20 to 60% of said total weight of inorganic salts.

References Cited in the file of this patent

UNITED STATES PATENTS 1,712,404    Rupp ------------------ May 7, 1929

OTHER REFERENCES

Seiden: Handbook of Feedstuffs, 1957, pages 294–298, Springer Pub. Co., N.Y.C.